J. C. Chapman,
Lathe Chuck,
N° 60,138.  Patented Dec. 4, 1866.
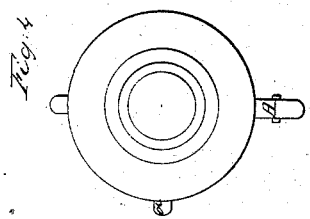
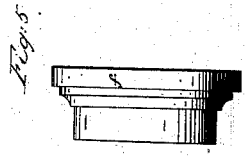
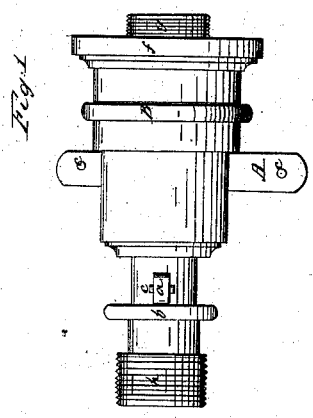
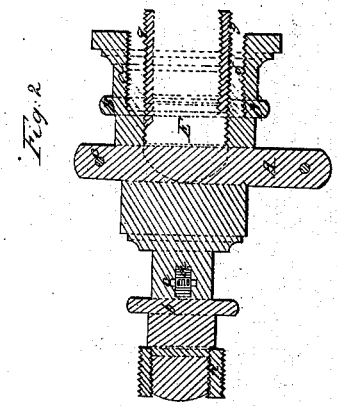
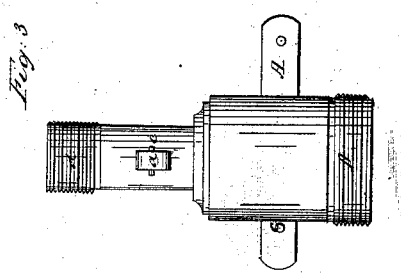
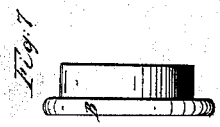
Witnesses.
Augustus Pratt
J. M. F. Howard
Inventor
John C. Chapman

United States Patent Office.

IMPROVEMENT IN CHUCKS.

JOHN C. CHAPMAN, OF CAMBRIDGEPORT, MASSACHUSETTS, ASSIGNOR TO HIMSELF AND DAVID W. WESTON, OF BOSTON, MASSACHUSETTS.

Letters Patent No. 60,138, dated December 4, 1866.

SPECIFICATION.

Be it known that I, JOHN C. CHAPMAN, of Cambridgeport, in the county of Middlesex, and State of Massachusetts, have invented a new and useful Improvement in Lathe Chucks, of which the following is a full, clear, and exact description of the construction and operation of the same, reference being had to the accompanying drawings, making part of this specification, in which—

Figure 1 is an elevation of my invention, showing also cylindrical specimens of work attached.

Figure 2 is a sectional view of the same.

Figure 3 is an elevation of the chuck divested of its collars.

Figure 4 is a front elevation of fig. 1.

Figure 5 is an elevation of a cylindrical piece of work detached from the chuck.

Figures 6 and 7 are detached views of collars forming part of my invention, and shown in figs. 1 and 2 attached to the chucks.

A a are bevelled keys sliding in a channel or key way cut through the diameter of the body of the chuck. B b are removable collars fitting loosely on the circumference of the chuck. c c c are prevention pins to retain the keys A a in position. D d are the threads of the male screws on each end of the chuck, to which work is attached. E is a removable bushing, shown in fig. 2. f is a cylindrical piece of work attached to this chuck by the male screw D, and shown detached in fig. 5. g is another piece of work in the form of a thimble, attached to a female screw in the larger end of the chuck. h is another thimble to be wrought, attached to the male screw d. In lathe chucks as at present constructed many articles to be wrought are connected with the chuck by the thread of a screw corresponding with a screw in the chuck, but the resistance to the tools in working is such as to force the article wrought with such pressure into the threads of the screw on the chuck that it is often difficult to disconnect the work without detaching it. The object of my invention is to overcome this difficulty. To accomplish this, I cut through the diameter of the body of the chuck near to either or both ends, channels, or key ways to receive the keys A a, which are bevelled from end to end, and sliding loosely in these key ways, are prevented from becoming wholly disconnected by means of the prevention pins c c c projecting through each end of these keys. Outside of these keys, on the circumference of the chuck, I affix the loosely-fitting collars B b. These keys being wider at one end than the other, I press the wider part into the channel or key way as far as the prevention pin in the wider end will allow it to enter, allowing the smaller end to project through. This presents the broader part of the key as a rest or support for the collars B b, against which the pieces of work to be wrought are screwed on to the respective male screws D d, so as to be held firmly in position. After the work is finished a slight blow upon the smaller end of the key will drive it back through its key way, relieving the collar from pressure and loosening at once the key, the collar, and the article wrought, which may now be easily disconnected from the screw to which it was attached. In the larger end of the chuck I construct a cylindrical recess, extending in depth to the key way in this end of the chuck, so that the bevelled key A passes through the bottom of the recess; this recess is provided with a female screw to which another variety of work, g, is attached. The loosely-fitting bushing E is dropped into the bottom of this recess, and rests upon the bevelled sides of the key A, which is also adjusted in this key way so as to present its broadest part as a rest or support to this bushing. The piece of work, g, is attached to this female screw, and is screwed in and against this bushing E until it is firmly held in position. By a blow upon the smaller end of this key A, it is started back, and the key and bushing are loosened, removing the pressure against the piece of work attached to this female screw, so that it may be easily disconnected. Either end of the chuck may be used in the manner I have described, the other end being connected in the usual manner to the lathe.

I claim the bevelled keys A a and the prevention pins c c c, in combination with the collars B b, operating substantially as above described.

I claim the bevelled key A and the prevention pins c c, in combination with the removable bushing E, operating substantially as above described.

JOHN C. CHAPMAN.

Witnesses:
AUGUSTUS RUSS,
J. M. F. HOWARD.